(12) United States Patent
Gao et al.

(10) Patent No.: US 11,804,943 B2
(45) Date of Patent: *Oct. 31, 2023

(54) METHOD AND DEVICE FOR CONFIGURING REFERENCE SIGNAL

(71) Applicant: ZTE Corporation, Guangdong (CN)

(72) Inventors: Bo Gao, Guangdong (CN); Yu Ngok Li, Guangdong (CN); Yijian Chen, Guangdong (CN); Zhaohua Lu, Guangdong (CN); Yifei Yuan, Guangdong (CN); Xinhui Wang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,855

(22) Filed: May 16, 2022

(65) Prior Publication Data

US 2022/0278815 A1 Sep. 1, 2022

Related U.S. Application Data

(63) Continuation of application No. 16/785,646, filed on Feb. 9, 2020, now Pat. No. 11,349,630, which is a
(Continued)

(30) Foreign Application Priority Data

Aug. 11, 2017 (CN) .......................... 201710687806.6

(51) Int. Cl.
*H04L 5/10* (2006.01)
*H04W 76/27* (2018.01)
(Continued)

(52) U.S. Cl.
CPC .............. *H04L 5/10* (2013.01); *H04L 1/0026* (2013.01); *H04L 5/0051* (2013.01);
(Continued)

(58) Field of Classification Search
CPC ....... H04L 5/10; H04L 1/0026; H04L 5/0051; H04L 5/0098; H04L 5/0094; H04L 5/005;
(Continued)

(56) References Cited

U.S. PATENT DOCUMENTS 10,098,109 B2  10/2018  Chen et al.
10,148,337 B2  12/2018  Ng et al.
(Continued)

FOREIGN PATENT DOCUMENTS

CN    103945447 A    7/2014
CN    104469945 A    3/2015
(Continued)

OTHER PUBLICATIONS

CATT, Beam management for control and data channel, 3GPP TSG RAN WG1 Meeting #88, Athens, Greece Feb. 13-17, 2017; R1-1702076 (Year: 2017).*
(Continued)

*Primary Examiner* — Shailendra Kumar
(74) *Attorney, Agent, or Firm* — Perkins Coie LLP

(57) ABSTRACT

Provided are a reference signal configuring method and device. The method includes: configuring a first-type parameter set of a first-type reference signal indicator, where the first-type parameter set includes N indicator elements, N is an integer greater than or equal to 1; generating first-type signaling according to the first-type parameter set, where the first-type signaling carries the first-type parameter set; and sending the first-type signaling to a second communication node.

20 Claims, 5 Drawing Sheets

Related U.S. Application Data continuation of application No. PCT/CN2018/096115, filed on Jul. 18, 2018.

(51) Int. Cl.

| | | |
|---|---|---|
| *H04L 1/00* | (2006.01) | |
| *H04L 5/00* | (2006.01) | |
| *H04W 56/00* | (2009.01) | |
| *H04W 72/0446* | (2023.01) | |
| *H04W 80/02* | (2009.01) | |
| *H04W 72/23* | (2023.01) | |

(52) U.S. Cl.
CPC ..... *H04W 56/001* (2013.01); *H04W 72/0446* (2013.01); *H04W 72/23* (2023.01); *H04W 76/27* (2018.02); *H04W 80/02* (2013.01)

(58) Field of Classification Search
CPC .... H04L 5/0007; H04L 5/0048; H04W 76/27; H04W 56/001; H04W 72/042; H04W 72/0446; H04W 80/02
See application file for complete search history.

(56) References Cited

U.S. PATENT DOCUMENTS

| | | | |
|---|---|---|---|
| 10,219,265 | B2 | 2/2019 | You et al. |
| 10,321,468 | B2 | 6/2019 | Xu et al. |
| 10,651,910 | B2 | 5/2020 | Chen et al. |
| 11,101,949 | B2 | 8/2021 | Park et al. |
| 2014/0126490 | A1 | 5/2014 | Chen et al. |
| 2015/0139001 | A1 | 5/2015 | Xue et al. |
| 2015/0201369 | A1 | 7/2015 | Ng et al. |
| 2018/0368142 | A1* | 12/2018 | Liou ................. H04W 74/0808 |
| 2019/0158155 | A1* | 5/2019 | Park .................... H04B 7/0626 |
| 2019/0364546 | A1 | 11/2019 | Kwak et al. |
| 2021/0136611 | A1* | 5/2021 | Tang .................... H04B 7/0647 |

FOREIGN PATENT DOCUMENTS

| | | |
|---|---|---|
| CN | 105025519 A | 11/2015 |
| CN | 106559164 A | 4/2017 |
| JP | 6162253 B2 | 7/2017 |
| KR | 20160055086 A | 5/2016 |
| WO | 2016018079 A1 | 2/2016 |
| WO | 2016163843 A1 | 10/2016 |

OTHER PUBLICATIONS

Qualcomm, Potential agreements on beam management, 3GPP RAN1 #89—May 15 to May 19, 2017 Hangzhou, China; R1-1709496 (Year: 2017).*
ZTE, ZTE Microelectronics, Beam related indication for DL and UL beam management 3GPP TSG RAN WG1 NR Ad-Hoc Meeting, Spokane, USA, Jan. 16-20, 2017;. R1-1700123 (Year: 2017).*
Samsung, 3GPP TSG RAN WG1 NR Ad-Hoc#2, Qingdao, China, Jun. 27-30, 2017, R1-1710690. (Year: 2017).*
Nokia, 3GPP TSG RAN WG1 NR Ad-Hoc#2, Qingdao, P.R. China, Jun. 27-30, 2017, R1-1711672 (Year: 2017).*
ZTE, "Discussion on DL beam management," 3GPP TSG RAN WG1 Meeting #89, R1-1707119, Hangzhou, P.R. China, May 15-19, 2017, 12 pages.
ZTE, "Beam grouping evaluation for beam management," 3GPP TSG RAN WG1 Meeting #89, R1-1707122, Hangzhou, P.R. China, May 15-19, 2017, 10 pages.
ZTE, "Discussion on beam indication," 3GPP TSG RAN WG1 Meeting #90, R1-1712298, Prague, Czechia, Aug. 21-25, 2017, 7 pages.
ZTE Corporation, "Consideration on CSI RS for beam management," 3GPP TSG RAN WG2#NR_AdHoc#2, R2-1706662, Qingdao, China, Jun. 27-29, 2017, 3 pages.
Ericsson, "Beam management in NR," 3GPP TSG-RAN WG2 #Ad Hoc, Tdoc R2-1706949, Qingdao, China, Jun. 27-29, 2017, 4 pages.
International Search Report and Written Opinion dated Oct. 10, 2018 for International Application No. PCT/CN2018/096115, filed on Jul. 18, 2018, 8 pages.
ZTE et al., "Beam related indication for DL and UL beam management," 3GPP TSG RAN WG1 NR Ad-Hoc Meeting, R1-1700123; 3rd Generation Partnership Project (3GPP), Mobile Competence Centre, Spokane, USA, Jan. 16-20, 2017, XP051207666, Retrieved from the Internet: URL:http://www.3gpp.org/ftp/Meetings_3GPP_SYNC/RAN1/Docs/, retrieved on Jan. 16, 2017, 7 pages.
CATT, "Beam management for control and data channel," 3GPP TSG RAN WG1 Meeting #88, R1-1702076, Mobile Competence Centre, Athens, Greece, Feb. 13-17, 2017, XP051209237, Retrieved from the Internet: URL: http://www.3gpp.org/ftp/Meetings_3GPP_SYNC/RAN1/Docs/, retrieved on Feb. 12, 2017, 4 pages.
Supplementary European Search Report in EP Patent Application No. 18844175, dated Jul. 2, 2020, 2 pages.
Qualcomm, "Potential agreements on beam management," 3GPP RAN1 #89, May 15-19, 2017, Hangzhou, China, R1-1709496.
ZTE, "Discussion on DL beam management," R1-1710183, Jun. 17, 2017, 3GPP TSG RAN WG1 NR Ad-Hoc#2, Qingdao, P.R. China, 16 pages.
Nokia, "Summary of QCL," 3GPP TSG RAN WG1 NR Ad-Hoc#2, Qingdao, P.R. China, Jun. 27-30, 2017, R1-1711672, 11 pages.
Samsung, "On QCL for NR," 3GPP TSG RAN WG1 NR Ad-Hoc#2, Qingdao, China, Jun. 27-30, 2017, R1-1710690.
ZTE, "QCL design for UL and DL MIMO," 3GPP TSG RAN WG1 NR Ad-Hoc#2, R1-1710202, Qingdao, P.R. China, Jun. 27-30, 2017, 9 pages.
Japanese office action issued in JP Patent Application No. 2020-507556, dated Mar. 28, 2023, 17 pages. English translation included.
Chinese office action issued in CN Patent Application No. 201710687806.6, dated Oct. 28, 2020, 6 pages. English translation included.
Chinese office action issued in CN Patent Application No. 201710687806.6, dated Feb. 9, 2021, 11 pages. English translation included.
Chinese notice of grant issued in CN Patent Application No. 201710687806.6, dated Apr. 29, 2021, 2 pages. English translation included.
Australian examination report issued in AU Patent Application No. 2018314611, dated Sep. 29, 2020, 4 pages.
Australian examination report issued in AU Patent Application No. 2018314611, dated Jul. 5, 2021, 4 pages.
Australian notice of acceptance issued in AU Patent Application No. 2018314611, dated Sep. 24, 2021, 3 pages.
Ndian examination report issued in IN Patent Application No. 202047010095, dated Aug. 17, 2021, 7 pages.
Japanese office action issued in JP Patent Application No. 2020-507556, dated May 18, 2021, 9 pages. English machine translation included.
Japanese office action issued in JP Patent Application No. 2020-507556, dated Feb. 1, 2022, 6 pages. English machine translation included.
Korean office action issued in KR Patent Application No. 10-2020-7007247, dated Jun. 23, 2021, 7 pages. English translation included.
Korean office action issued in KR Patent Application No. 10-2020-7007247, dated Dec. 15, 2021, 5 pages. English translation included.
Korean notice of allowance issued in KR Patent Application No. 10-2020-7007247, dated Feb. 11, 2022, 10 pages. English machine translation included.
European Communication under Rule 71(3) EPC issued in EP Patent Application No. 18844175.2, dated Jul. 7, 2023, 46 pages.
Japanese office action issued in JP Patent Application No. 2020-507556, dated Aug. 29, 2023, 8 pages. English translation included.

* cited by examiner

METHOD AND DEVICE FOR CONFIGURING REFERENCE SIGNAL

CROSS-REFERENCE TO RELATED APPLICATIONS

This patent document is a continuation of U.S. patent application Ser. No. 16/785,646, filed Feb. 9, 2020, which is a continuation of and claims the benefit of priority to International Patent Application No. PCT/CN2018/096115, filed on Jul. 18, 2018, which claims the benefit of priority to Chinese Patent Application No. 201710687806.6, filed on Aug. 11, 2017. The entire contents of the before-mentioned patent applications are incorporated by reference as part of the disclosure of this application.

TECHNICAL FIELD

The present disclosure relates to, but is not limited to, the field of communications.

BACKGROUND

The high frequency band of the Ultra Wide Band (e.g., millimeter wave communication) has become an important direction for the future development of mobile communications, attracting the attention of global academics and industry. In particular, with the increasing congestion of spectrum resources and large amount of physical networks accessing, advantages of millimeter wave become more and more attractive. Many standards organizations, such as IEEE and 3GPP, have begun to carry out corresponding standardization work. For example, in a 3GPP standard group, higher frequency band communication becomes an important innovation point of 5G new radio access technology (New RAT) due to its significant advantage of large bandwidth.

However, the higher frequency communication also confronts a challenge of link attenuation. Specifically, the link attenuation includes large propagation path loss, greater air (especially oxygen) absorption, and greater rain attenuation effects. Facing these challenges, the higher frequency communication system can take advantage of short wavelength of the higher frequency band and easy antenna integration, and acquire high antenna gain and counteract the signal transmission loss through multiple-antenna array and beamforming, thereby ensuring link margin and improving communication robustness.

During antenna weight (which is also called as precoding, beam) training, a higher frequency band transmitter sends a training pilot, and a receiver receives a channel and performs channel estimation. Then, the higher frequency band receiver needs to feed channel state information back to a training transmitter, such that the transmitter and the receiver can select multiple transmitting-receiving antenna weight pairs required by multi-path data transmission from available transmitting-receiving antenna weight pairs and improve overall spectral efficiency. In the related millimeter wave communication system, the beam indication is based on a sequence number of the transmitting beam, and further assists beam training of the receiver. Beam indication is implemented through the reference signal. Due to user movement and channel changes, beam indication becomes increasingly difficult to use, and faces the problem of significantly increasing of reference signal overhead.

No effective solutions have been proposed yet for how to effectively apply the reference signal indicator to the subsequent configuration operation of the reference signal attributes or characteristics in the existing art, e.g., for the problem of how to configure the reference signal.

SUMMARY

Embodiments of the present disclosure provide a reference signal configuring method and device.

According to an embodiment of the present disclosure, a reference signal configuring method is provided and applied to a first communication node. The method including: configuring a first-type parameter set of a first-type reference signal indicator, where the first-type parameter set includes N indicator elements, N is an integer greater than or equal to 1; generating first-type signaling according to the first-type parameter set, where the first-type signaling carries the first-type parameter set; and sending the first-type signaling to a second communication node.

According to another embodiment of the present disclosure, a reference signal configuring device is provided and applied to a first communication node. The device including: a first configuring module, which is configured to configure a first-type parameter set of a first-type reference signal indicator, where the first-type parameter set includes N indicator elements, N is an integer greater than or equal to 1; a first generating module, which is configured to generate first-type signaling according to the first-type parameter set, where the first-type signaling carries the first-type parameter set; and a first sending module, which is configured to send the first-type signaling to a second communication node.

According to another embodiment of the present disclosure, a reference signal configuring method is provided and applied to a second communication node. The method including: receiving first-type signaling sent by a first communication node; determining a set first-type parameter set of a first-type reference signal indicator according to the first-type signaling, where the first-type parameter set includes N indicator elements, N is an integer greater than or equal to 1.

According to another embodiment of the present disclosure, a reference signal configuring device is provided and applied to a second communication node. The device including: a first reception module, which is configured to receive first-type signaling sent by a first communication node; and a processing module, which is configured to determine a set first-type parameter set of a first-type reference signal indicator according to the first-type signaling, where the first-type parameter set includes N indicator elements, N is an integer greater than or equal to 1.

Another embodiment of the present disclosure provides a storage medium. The storage medium includes stored programs which, when executed, perform the method of any one of the embodiments described above.

Another embodiment of the present disclosure provides a processor. The processor is configured to execute programs. When executed, the programs perform the method of any one of the embodiments described above.

Through the embodiments of the present disclosure, a first-type parameter set of a first-type reference signal indicator is configured, where the first-type parameter set includes N indicator elements, N is an integer greater than or equal to 1. First-type signaling is generated according to the first-type parameter set, where the first-type signaling carries the first-type parameter set. The first-type signaling is sent to a second communication node. The problem in the existing art of how to efficiently apply a reference signal indicator to subsequent setting operations of reference signal attributes or characteristics, i.e., how to set the reference signal, is solved. The reference signal configuration is implemented. The reference information indicator set can be flexibly expanded or modified.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure. In the drawings.

DETAILED DESCRIPTION

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
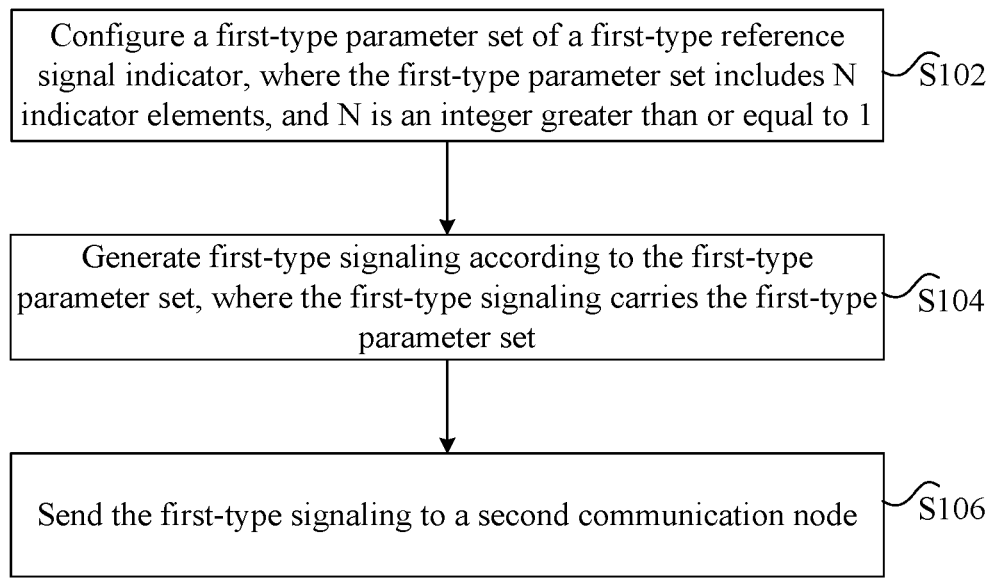
FIG. 1 is a flowchart of a reference signal configuring method according to an embodiment of the present disclosure.

This embodiment provides a reference signal configuring method, applied to a first communication node. FIG. 1 is a flowchart of a reference signal configuring method according to the embodiment of the present disclosure. As shown in FIG. 1, the method includes the steps described below.

In step S102, a first-type parameter set of a first-type reference signal indicator is configured, where the first-type parameter set includes N indicator elements, and N is an integer greater than or equal to 1.

In step S104, first-type signaling is generated according to the first-type parameter set, where the first-type signaling carries the first-type parameter set.

In step S106, the first-type signaling is sent to a second communication node.

Correspondingly, the second communication node receives the first-type signaling sent by the first communication node.

The second communication node determines the configured first-type parameter set of the first-type reference signal indicator according to the first-type signaling.

Through the above steps, the first-type parameter set of the first-type reference signal indicator is configured, where the first-type parameter set includes N indicator elements, and N is an integer greater than or equal to 1. The first-type signaling is generated according to the first-type parameter set, where the first-type signaling carries the first-type parameter set. The first-type signaling is sent to a second communication node. The problem in the existing art of how to efficiently apply a reference signal indicator to subsequent setting operations of reference signal attributes or characteristics, e.g., how to set the reference signal, is solved. The reference signal configuration is implemented. The reference information indicator set can be flexibly expanded or modified.

In an embodiment, the first-type parameter set at least includes one of: mapping information of a data channel resource element (RE), mapping information of a control channel RE, quasi co-location (QCL) information of a DeModulation reference signal (DMRS) port; QCL information of a DMRS port group; or reference signal setting information of a channel state information reference signal (CSI-RS).

In an embodiment, the first-type parameter set includes F first-type parameter subsets, each of which includes G indicator elements, where F and G are integers greater than or equal to 1.

In an embodiment, a reference signal included in the first-type parameter subset is associated with one of the G indicator elements.

The association means that the reference signal included in the first-type parameter subset of the first type parameter set and a reference signal corresponding to the associated indicator element satisfy a channel characteristic assumption, where the channel characteristic assumption includes one of: a QCL assumption, a spatial QCL assumption, or satisfying a spatial receiving parameter requirement.

In an embodiment, the indicator element includes at least one of the following setting information: an indicator element number, a reference signal (RS) type indicator, a RS resource setting indicator, a RS resource set indicator, a RS resource indicator, a RS resource port indicator, a block indicator, a block burst indicator, a block burst set indicator, a measurement restriction window indicator, a time-domain window indicator, a reporting setting indicator, a beam group indicator, measurement restriction, setting restriction, or time-domain restriction.

In an embodiment, when the first-type signaling is sent to the second communication node, the first-type reference signal is a configured, measured, or reported reference signal.

In an embodiment, the first-type reference signal includes at least one of: a synchronization signal block (SS block), a channel state information reference signal (CSI-RS), a sounding reference signal (SRS), a physical random access CHannel (PRACH), or a demodulation reference signal (DMRS).

In an embodiment, the method further includes: updating part of the indicator elements of the first-type parameter set, or part of subsets of a first-type reference signal set; or deleting part of the indicator elements of the first-type parameter set, or part of the subsets of the first-type reference signal set; or adding an indicator element to the first-type parameter set.

In an embodiment, if a configured indicator element number in the first-type parameter set is consistent with an indicator element number indicated by the signaling, the content under the configured indicator element number is updated or configured to be a content carried by the signaling according to signaling indication.

In an embodiment, a maximum number of supporting the first-type reference signal indicator is greater than or equal to N.

In an embodiment, the method further includes: generating second-type signaling, and sending the second-type signaling to the second communication node. The second-type signaling is used for selecting, activating, or deactivating the indicator elements in the first-type parameter set, or first-type parameter subsets of the first-type parameter set. For example, K selected or activated indicator elements or K selected or activated first-type parameter subsets form a second-type parameter set, where K is an integer greater than or equal to 1.

Correspondingly, the second communication node receives the second-type signaling sent by the first communication node.

According to the second-type signaling, the second communication node selects, activates or deactivates the indicator elements in the first-type parameter set or first-type parameter subsets of the first-type parameter set.

In an embodiment, the method further includes: adding an indicator element to the second-type parameter set; or deleting an indicator element not belonging to the first-type parameter set from the second-type parameter set.

In an embodiment, the method further includes: selecting indicator elements from at least one of the second-type parameter set or the first-type parameter set to make up a third-type parameter set. The third-type parameter set includes R subsets, and each third-type parameter subset includes hi indicator elements, where R and hi are integers greater than or equal to 1.

In an embodiment, the method further includes: generating third-type signaling, and sending the third-type signaling to the second communication node. The third-type signaling is used for indicating that the indicator elements in the first-type parameter set, or the indicator elements in the second-type parameter set, or subsets of the third-type parameter set are mapped with and associated with second-type reference signals.

Correspondingly, the second communication node receives the third-type signaling sent by the first communication node.

According to the third-type signaling, the second communication node determines that the indicator elements in the first-type parameter set, or the indicator elements in the second-type parameter set, or the subsets of the third-type parameter set are mapped with and associated with second-type reference signals.

In the embodiment, the second-type reference signals further include one of: mapping information of a data channel resource element (RE), mapping information of a control channel RE, DMRS port information; DMRS port group information; or configuration information of a channel state information reference signal (CSI-RS), or physical downlink shared channel RE mapping and quasi-co-location indicator (PQI) information.

In an embodiment, the method further includes: generating fourth-type signaling, and sending the fourth-type signaling to the second communication node.

The fourth-type signaling indicates that indicator elements in the second-type parameter set, or activated or selected first-type parameter subsets in the second-type parameter set, or the first-type parameter subsets of the first-type parameter set, or the indicator elements in the first-type parameter set are used for the demodulation and/or beam indication of a data channel or control channel associated with the fourth-type signaling.

Correspondingly, the second communication node receives the fourth-type signaling sent by the first communication node.

According to the fourth-type signaling, the second communication node determines that indicator elements in the second-type parameter set, or activated or selected first-type parameter subsets in the second-type parameter set, or the first-type parameter subsets of the first-type parameter set, or the indicator elements in the first-type parameter set are used for the demodulation and/or beam indication of a data channel or control channel associated with the fourth-type signaling.

In an embodiment, the method further includes that: the second-type reference signal includes U second-type reference signal subsets, where each of the U second-type reference signal subsets satisfies a channel characteristic assumption. The number of the indicator elements in the first-type parameter set, the number of the indicator elements in the second-type parameter set, or the number of the indicator elements in the third-type parameter subset is T, where U and T are integers greater than or equal to 1. The channel characteristic assumption includes one of: the QCL assumption, the spatial QCL assumption, or satisfying the spatial receiving parameter requirement.

In an embodiment, the second-type reference signal subset or second-type reference signal element can only be mapped with one indicator element.

In an embodiment, the mapping rule includes at least one of the following rules.

A mapping relationship is specified, where the mapping relationship is configured by the first communication node or is from a predefined mapping relationship set.

It is specified that, according to a low-to-high sequence number order or a high-to-low sequence number order, the U second-type reference signal subsets are sequentially mapped with T indicator elements or subsets with a step V.

According to a predefined mapping pattern, the U second-type reference signal subsets are sequentially mapped with the T indicator elements or subsets.

V is 1, or is an positive number greater than 1 or less than 1. When an accumulated step is not an integer, V is rounded to an integer.

In an embodiment, $V=T/U$ or V is specified by the first communication node.

In an embodiment, the second-type reference signal at least includes one of: an uplink DeModulation reference signal (UL DMRS), a downlink DeModulation reference signal (DL DMRS), a channel state information reference signal (CSI-RS), a sounding reference signal (SRS), or a tracking reference signal (TRS).

In an embodiment, reference signals corresponding to the indicator elements in the first-type parameter set, or the indicator elements in the second-type parameter set, or the subsets in the third-type parameter set, and the second-type reference signals satisfy a channel characteristic assumption, where the channel characteristic assumption includes one of: the QCL assumption, the spatial QCL assumption, or satisfying the spatial receiving parameter requirement.

In an embodiment, the method may further include: a time period from a transmission of signaling of the second-type parameter set to an effective time of the signaling of the second-type parameter set or a time period from a transmission of signaling of the third-type parameter set to an effective time of the signaling of the third-type parameter set includes Y time units or X time windows. The time units are orthogonal frequency division multiplexing (OFDM) symbols, slots or subframes.

In an embodiment, the method may further include: after activating or selecting the indicator elements in the first-type parameter set or adding an indicator element to the second-type parameter set, sending third-type reference signal satisfying the channel characteristic assumption with the elements, where the channel characteristic assumption includes one of: a QCL assumption, a spatial QCL assumption, or satisfying a spatial receiving parameter requirement.

In an embodiment, the method may further include: sending the third-type reference signal, in response to activating or selecting the indicator elements in the first-type parameter set or adding the indicator element to the second-type parameter set, after X time units or X time units after an acknowledgement replied by the second communication node, or sending the third-type reference signal on a period or semi-persistent sending window, where X is an integer greater than or equal to 0, the time units are OFDM symbols, slots or subframes.

In an embodiment, the third-type reference signal further includes one of: the CSI-RS, the CSI-RS used for time frequency tracking, or the TRS.

The embodiment of the present disclosure establishes an indicator indication information pool needed by the association (combination) of a reference signal and a prior reference signal, and the effective time and mapping method of the association (combination). Further, the embodiment of the present disclosure serves a beam indication of DL and UL reference signals (group). In addition, a hierarchical reference signal indicator indication method is provided. In conjunction with activating a time frequency tracking signal and specifying a latency duration, the one-to-one mapping relationship between the reference signals and reference signals, the one-to-many mapping relationship between the reference signals and reference signals, the many-to-many mapping relationship between the reference signals and reference signals, as well as the channel characteristic assumption are achieved. This solution has no global beam number indication, and the beam indication can be implemented by flexibly expanding or modifying the reference signal indicator set.

The channel characteristic includes a physical transmission channel characteristic, such as a horizontal transmitting azimuth, a vertical transmitting azimuth, a horizontal receiving azimuth, and vertical receiving azimuth, and further includes characteristics of a radio frequency and a baseband circuit, such as an antenna element pattern, an antenna placement, and a time offset, a frequency offset and a phase noise of baseband.

The beam may be a resource (such as a transmitter precoding, a receiver precoding, an antenna port, an antenna weight vector, and an antenna weight matrix), a beam symbol may be replaced with a resource indicator because the beam may be bound to some time-frequency code resources in transmission. The beam may also be a transmission (send/receive) mode, and the transmission mode may include space division multiplexing, frequency domain/time domain diversity, and the like.

The beam indication means that the transmitting end may perform indication through a QCL assumption of a current reference signal and an antenna port as well as an antenna port and a reference signal (or a reference RS) fed back by a UE.

The receiving beam refers to a beam of the receiving end that does not need to be indicated, or beam resources of the receiving end which are indicated to the transmitting end through a QCL assumption of a current reference signal and an antenna port as well as an antenna port and a reference signal (or a reference RS) fed back by a UE.

Parameters related to the QCL at least include: Doppler spread, Doppler shift, delay spread, average delay, average gain, or a spatial receiving parameter.

Figure 2:
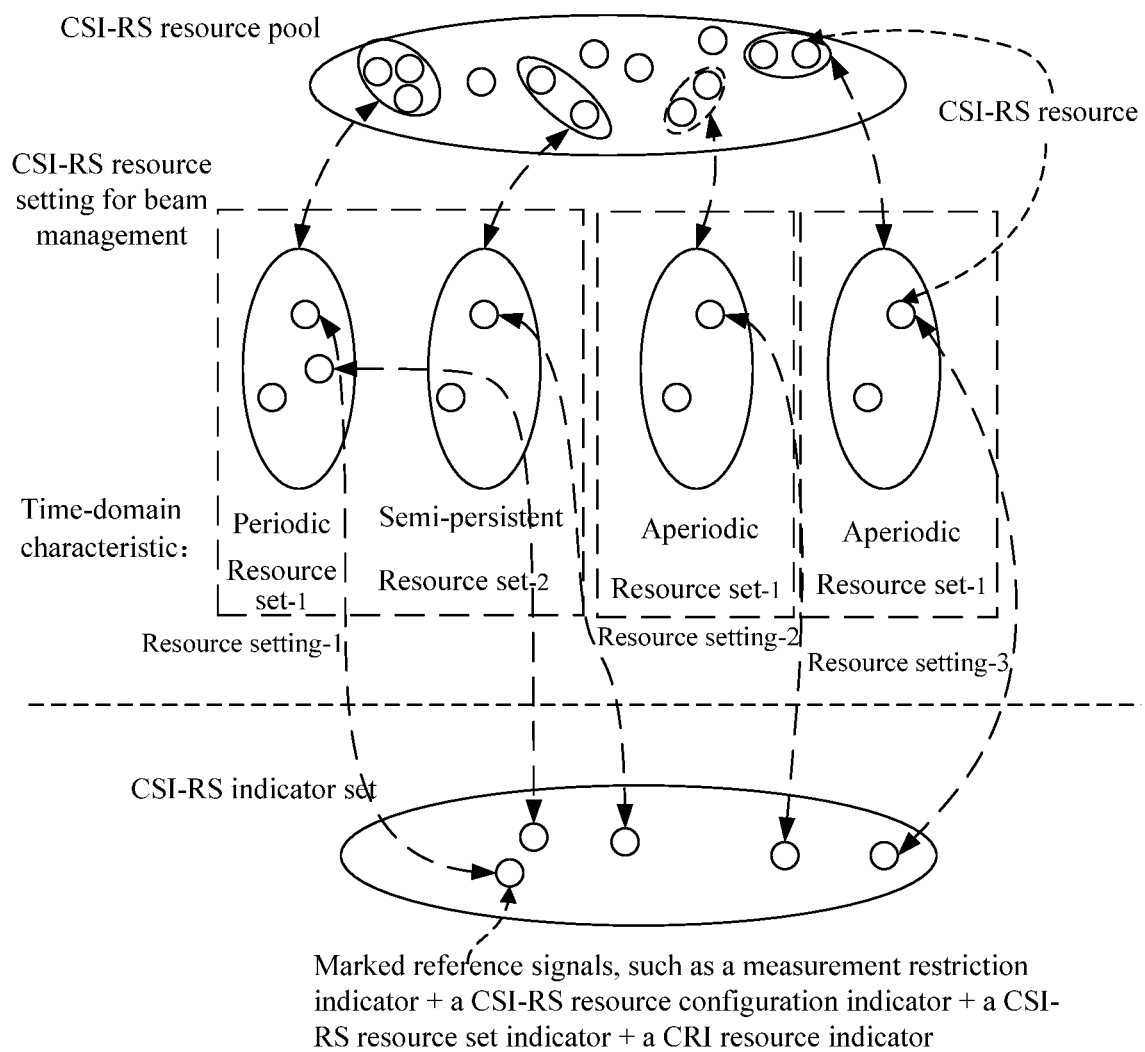
FIG. 2 is a schematic diagram of a reference signal associated indicator set according to an embodiment of the present disclosure.

FIG. 2 is a schematic diagram of a reference signal related indicator set according to an embodiment of the present disclosure. As shown in FIG. 2, a base station sets a CSI-RS resource pool through a Radio Resource Control (RRC) signaling message. The setting of the resource pool is sent to each user through UE-specific RRC or a system broadcast message. Each CSI-RS resource has indicator information, and then a CSI-RS resource setting is performed. Specifically, some resources are selected from the CSI-RS resource pool to form a CSI-RS resource set. One CSI-RS resource setting may include multiple CSI-RS resource sets. Meanwhile, parameters of each CSI-RS resource are configured accordingly, such as element mapping, a port quantity, a time domain behavior characteristic (such as periodic, semi-persistent, and aperiodic).

Through the measurement and report of the reference signal, a base station may select an ideal reference signal indicator from the previously sent reference signals, e.g., transmitting beam information. Specifically, the base station sets a first-type set of indicators associated with a first-type reference signal, where the set includes N indicator elements.

First-type signaling is generated to carry the set.

The first-type signaling is sent to a second communication node.

N is an integer greater than or equal to 1.

The indicator element includes at least one or a combination of the following setting information: an indicator element number, a reference signal (RS) type indicator, a RS resource setting indicator, a RS resource set indicator, a RS resource indicator, a RS resource port indicator, a block indicator, a block burst indicator, a block burst set indicator, a measurement restriction window indicator, a time-domain window indicator, a reporting setting indicator, a beam group indicator, measurement restriction, setting restriction, or time-domain restriction.

The measurement restriction means that the most recently measured tag, or the last X measured tags, or a corresponding tag of each measurement indicates to set a combination of a most recent tag-k, interference or signal measurement for restriction. X is an integer greater than or equal to 1. Further, the base station determines that the reference signal indicator is indicator information in an interference-oriented measurement mode or indicator information in a channel-oriented measurement mode. Furthermore, the two types of measurement modes may share part of the reference signal setting.

The setting restriction means that the most recent setting, or the last Y settings, or a corresponding tag of each setting indicates to set the most recent tag-m. Y is an integer greater than or equal to 1.

The time restriction is a time domain window x, or the closest time window. x is a representation indicator for the time-domain window. Furthermore, the time domain restriction refers to a higher-level indicator of a measurement limitation window. For example, the measurement limitation window indicator has a variation range of 0 to 3, and cycles periodically in the time domain. The time domain restriction refers to an indicator of each cycle in the periodic cycles, such as varying within a range of 0 to 15. It is to be emphasized that considering periodic characteristics, it is the most recent time domain window 0 to 15 with respect to a configuration occasion.

The first-type signaling may be RRC signaling or MAC-CE signaling.

In addition, the indicator information is associated with a time domain reference point (such as a previous time unit X, or the last X configured time unit) that serves as the benchmark. However, the time domain reference point serving as the benchmark is a transmitting occasion of the first-type signaling; or the transmitting occasion of the first-type signaling plus a predefined or preconfigured time domain offset; or a periodic time domain reference point is configured, a latest, newly occurring, or about to be sent time domain reference point (in the periodic time domain reference point) of an occasion sending the first-type signaling is taken as the time domain reference point serving as the benchmark, or a periodic time domain window is configured, a recently undergoing, undergoing, or about to undergoing time domain window (in the periodic time domain window) of the occasion sending the first-type signaling is taken as the reference time domain reference point.

It is to be noted that the first-type reference signal is a configured reference signal, a measured reference signal, or a reported reference signal. The first-type reference signal includes at least one of: an SS block, a CSI-RS, an SRS, a PRACH, or a DMRS.

For the convenience of discussion, only CSI-RS signals are involved in FIG. 2, but it does not mean that other reference signals and multiple reference signals are not related. For example, SS block: the indicator information may be one or a combination of: an SS block indicator; an SS block burst indicator; an SS block burst set indicator; a time domain window indicator.

Periodic or semi-persistent CSI-RS: the indicator information may be Window/reporting ID+CSI-RS resource set ID+CRI (CSI-RS resource indicator), or Window/reporting ID+CSI-RS resource setting ID (+CSI-RS resource set ID)+CRI. Further, a window ID here may be a measurement limitation window indicator, or a report setting indicator. Furthermore, the window ID (such as the measurement limitation indicator) may be constituted by two levels of indicators. For example, the measurement limitation window indicator changes from 0 to 3, and cycles in a time domain period; and the time domain restriction indicates an indicator of each cycle in the cycle period, such as varying in a range of 0 to 15. It is to be emphasized that considering periodic characteristics, the most recent time domain window is from 0 to 15 with respect to a configuration moment.

Aperiodic CSI-RS: the indicator information may be Window/reporting ID+CSI-RS resource ID+CRI or Window/reporting ID+CSI-RS resource setting ID (+CSI-RS resource set ID)+CRI, or the recently triggered CSI-RS resource setting or CSI-RS resource setting ID+CSI-RS resource set ID+CRI in the report setting.

Periodic or semi-persistent CSI-RS: the indicator information may be Window ID/SRS resource setting ID+(SRS resource set ID)+SRI (the SRS resource indicator).

Aperiodic or semi-persistent SRS: Window ID/SRS resource setting ID+(SRS resource set ID)+SRI or the recently triggered (SRS resource set X)+SRI.

In addition, through RRC or MAC-CE signaling, the base station may reconfigure the first-type set. The specific operation includes: updating part of the indicator elements in the first-type set; or updating part of the indicator elements in the first-type set; or adding an indicator element to the first-type set.

To implement reconfiguration, if a configured indicator element number in the first-type parameter set is consistent with indicator element number indicated by the signaling, the content under the configured indicator element number is updated according to signaling indication.

Although the maximum number is N in each configuration from a perspective of configuration, from a perspective of standard supporting, the maximum number supporting the indicator elements is greater than or equal to N.

Figure 3:
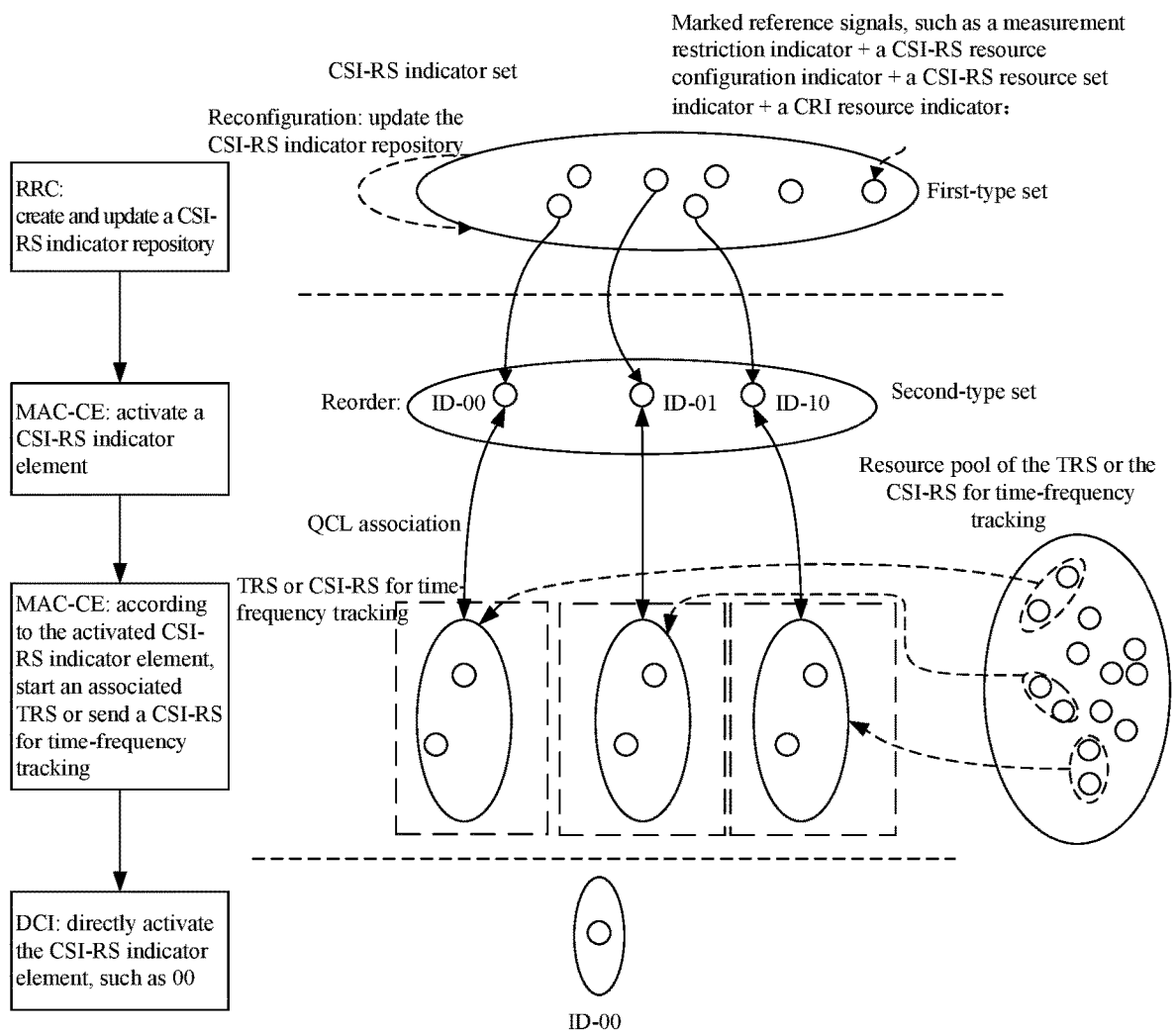
FIG. 3 is a schematic diagram of indication of a channel characteristic of a reference signal according to an embodiment of the present disclosure.

FIG. 3 is a schematic diagram of the indication of a channel characteristic of a reference signal according to an embodiment of the present disclosure. As shown in FIG. 3, according to the configured or reconfigured first-type set, the base station sends the second-type signaling for activating or deactivating the indicator elements in the first-type set, and the K activated indicator elements constitute the second-type set. Taking the CSI-RS as an example, the base station selects to activate the indicator elements in the CSI-RS indicator set. In addition, the base station may directly reconfigure the second-type set, including adding indicator elements to the second-type set; or deleting indicator elements that do not belong to the first-type set from the second-type set.

Further, when the indicator elements in the first-type set are activated, or the indicator elements are added to the second-type set, the first communication node directly sends the third-type reference signal on the periodic or semi-persistent sending window after X time units or after the second communication node replies acknowledged X time units according to a predefined transmission mode. The third-type reference signal needs to activate the indicator elements in the first type set, or add the indicator elements to the second type set to satisfy the channel characteristic assumption. Furthermore, the channel characteristic assumption is a QCL assumption, a spatial QCL assumption, or satisfying a spatial receiving parameter requirement.

X is an integer greater than or equal to 0, and the time unit may be an OFDM symbol, a slot, or a subframe. Furthermore, the third-type reference signal is a CSI-RS, a CSI-RS for time-frequency domain tracking, or a TRS.

In addition, the setting of the third-type reference signal, activating the indicator elements in the first-type set, and adding the indicator elements to the second type set may be preset. For example, a potential transmitting window of the third-type reference signal is first configured in the RRC signaling (such as a relationship with the SS block) and the relationship with the benchmark reference signal. And then, the third-type reference is transmitted for a correspondence between the benchmark reference signal and the reference signal represented by the indicator elements under "activating the indicator elements of the first-type reference signal, or adding the indicator elements to the second type set."

For example, when the TRS signal is configured, a correspondence relationship between the TRS and the SS block is first configured. Then, after the indicator element of the first-type reference signal is activated, the reference signal corresponding to the indicator element and a certain SS block satisfy the channel characteristic assumption. Based on this, the TRS signal that satisfies the channel characteristic assumption with the same SS block is enabled.

This operation may indicate based on preconfigured or additional signaling.

Then, according to the first type set whose indicator elements are activated or the second-type set in which the indicator elements are added, the base station indicates that the indicator elements are used for performing the beam indication. It is to be noted that through selecting from the first set to the second set, the number of elements in the second set is significantly less than that in the first set. Therefore, when the DCI performs the beam indication, the DCI cost is greatly reduced. For example, only two bits are required. The beam indication means that the demodulation reference signal of a control or data channel and the reference signal indicated by the DCI satisfy the spatial QCL assumption, e.g., obeying a spatial receiving parameter assumption. In some embodiments, the base station generates third-type signaling. The third-type signaling indicates that the indicator elements in the second-type set or subsets of the third-type set are associated with the second-type reference signals, and the association indicates that the second-type reference signals and the reference signals which correspond to the indicator elements in the second-type set or subsets of the third-type set satisfy the channel characteristic assumption. The channel characteristic assumption includes one of: the QCL, a spatial QCL parameter, or a spatial receiving QCL parameter.

Figure 4:
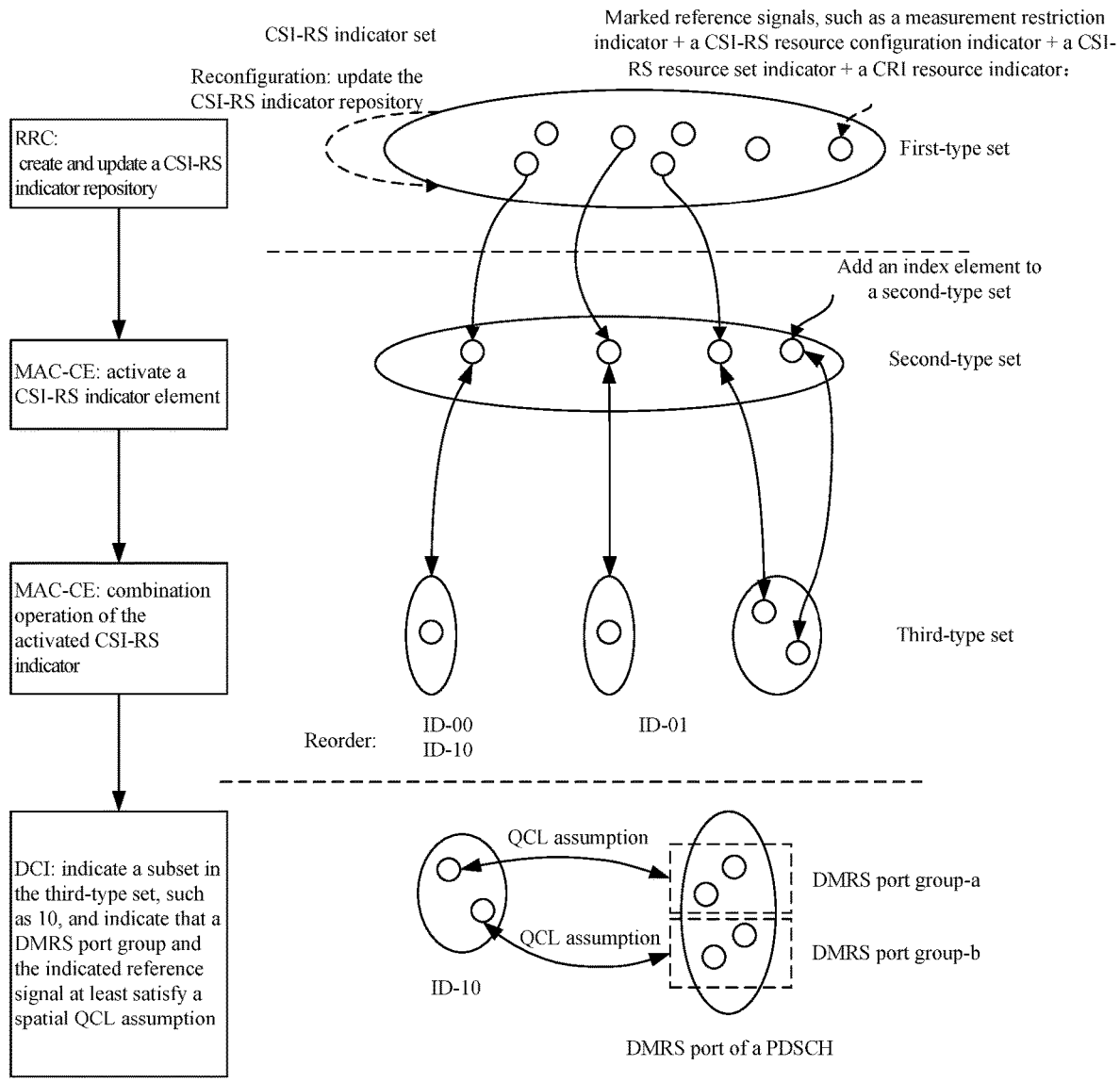
FIG. 4 is a schematic diagram of grouping a set of reference signal indicator(s) according to an embodiment of the present disclosure.

FIG. 4 is a schematic diagram of a reference signal number combination grouping according to an embodiment of the present disclosure. As shown in FIG. 4, a method of constructing the third-type set is illustrated. Specifically, the third-type set is constructed by indicator elements selected from the second-type set and/or the first-type set, and includes R third-type subsets, where the third-type subset includes hi indicator elements. For example, in the figure, the third-type set includes three subsets, and a third subset (ID-10) includes two pieces of indicator information, representing that two different beam directions may be indicated at the same time. Then, the DCI signaling indicates that the subset of the third-type set (for example. 10 represents a DMRS port group) is associated with an indicated reference signal indicator subset, e.g., at least satisfying the spatial QCL assumption or the QCL assumption of "Doppler spread, Doppler shift, delay spread, average delay and spatial receiving parameters".

As shown in FIG. 4, first, the CSI-RS indicator repository (e.g., the first-type set) is set and updated through the RRC signaling, and then an MAC-CE activates the CSI-RS indicator element (e.g., the second-type set). Moreover, the MAC-CE may directly add indicator elements into the second-type set. Based on the second-type set, the MAC-CE may choose to construct the third-type set from the second-type set. The third-type set includes three subsets, where the ID-10 subset includes two indicator elements. The DCI signaling selects a subset from the third-type set to perform QCL assumption indication for the DMRS port of the PDSCH. The indicator elements under the ID-10 are mapped with DMRS port groups a and b. The second-type reference signal subset or second-type reference signal element can only be mapped with one indicator element of the ID-10 subset.

The second-type reference signal may be at least one or a combination of: the UL DMRS, the DL DMRS, the CSI-RS, the SRS or the TRS.

Furthermore, the second-type reference signals include U second-type reference signal subsets, where each second-type reference signal subset satisfies the channel characteristic assumption.

The number of indicated indicator elements in the second-type set or the number of indicated indicator elements in the third-type subset is T.

The association means that according to a predefined rule, the second-type reference signal subset is mapped with the indicated indicator element.

The predefined rule includes one or a combination of the following rules.

A mapping relationship is specified, where the mapping relationship is configured by the first communication node or is from a predefined mapping relationship set.

It is specified that, according to a low-to-high sequence number order or a high-to-low sequence number order, the U second-type reference signal subsets are sequentially mapped with T indicator elements or subsets with a step V.

According to a predefined mapping pattern, the U second-type reference signal subsets are sequentially mapped with the T indicator elements or subsets.

V is 1, or is an positive number greater than 1 or less than 1, in response to determining that. When an accumulated step is not an non-integer, V is rounded up to an integer, or rounded down to an integer, or is rounded to a nearest integer. In addition, if U is less than T/V, the indicator element at the last bit is discarded. If U is greater than T/V, cyclic mapping is performed. Further, V=T/U, or V is specified by the first communication node.

In addition, it takes Y time units or U time windows from the generation of the second-type or third-type set signaling to the time the second-type or third-type set signaling comes into effect.

The time unit may be an OFDM symbol, a slot, or a subframe.

Figure 5:
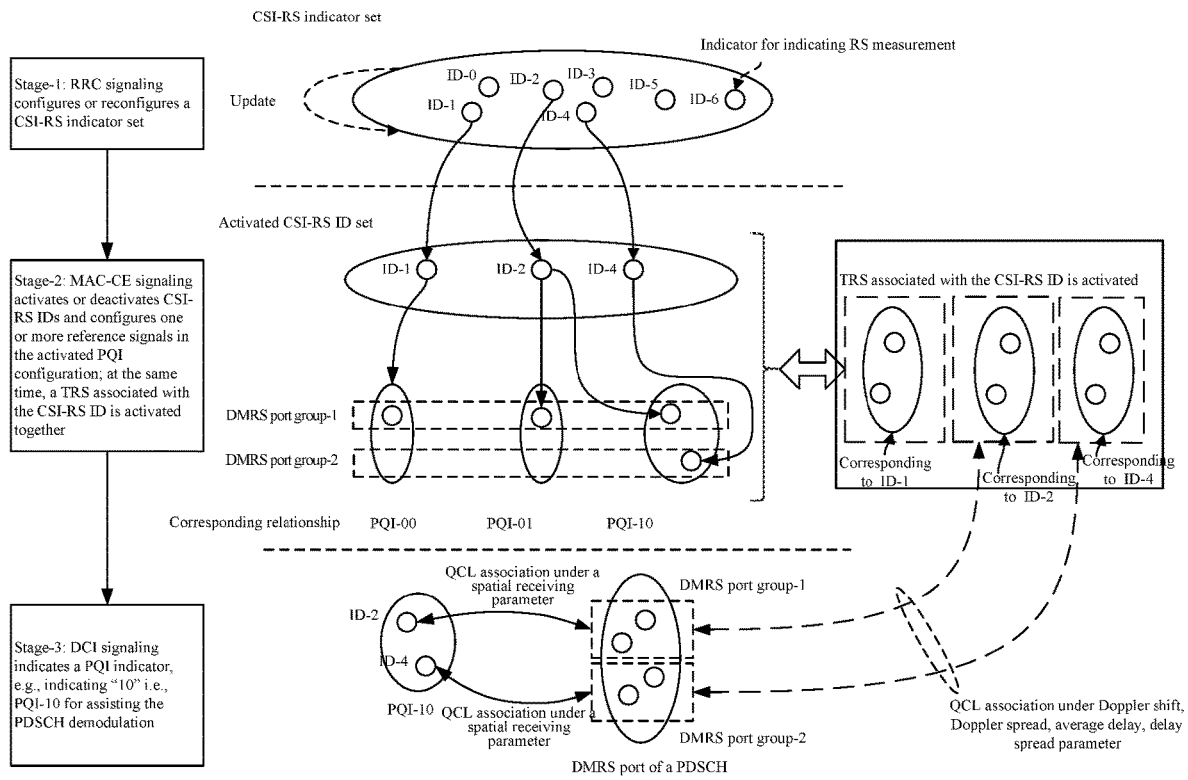
FIG. 5 is a schematic diagram showing that a channel characteristic and resource mapping of a reference signal are jointly indicated through a physical downlink shared channel RE mapping and quasi-co-location indicator (PQI) and a CSI-RS indicator element according to an embodiment of the present disclosure.

FIG. 5 is a schematic diagram of jointly indicating a reference signal channel characteristic and a resource mapping through a PQI and a CSI-RS indicator element according to an embodiment of the present disclosure. As shown in FIG. 5, a CSI-RS indicator set is configured through higher layer signaling. As shown in Table 1, the CSI-RS indicator set and indication information of the CSI-RS resources corresponding to the indicator elements in the indicator set are included. Furthermore, an indication of a transmitting beam is indicated by the indication information of the CSI-RS resources corresponding to the indicator elements, for example, the indication of the transmitting beam is represented through CSI-RS resource setting ID+CSI-RS resource indicator (CRI) or CSI-RS resource setting ID+CSI-RS resource set indicator+CSI-RS resource indicator (CRI).

TABLE 1

| Indicator elements in CSI-RS indicator set | CSI-RS indication information of the transmitting beam |
| --- | --- |
| 0 | (CSI-RS resource setting ID0, CRI0) |
| 1 | (CSI-RS resource setting ID1, CRI1) |
| 2 | (CSI-RS resource setting ID2, CRI2) |
| ... | |
| 15 | (CSI-RS resource setting ID15, CRI15) |

In addition, the base station also configures N PQI parameter sets through the higher layer signaling for indicating PDSCH RE mapping and QCL information. Each PQI parameter set includes mapping information of a data channel resource element (RE), mapping information of a control channel RE, QCL information of a DMRS port; QCL information of a DMRS port group; or CSI-RS reference signal setting information.

Then, the base station activates or deactivates CSI-RS indicators from the CSI-RS indicator set and selects M parameter sets from the N PQI parameter sets, where M and N are integers greater than 1.

The DMRS port group in each PQI parameter set is configured with one or more activated CSI-RS indicators which are from the CSI-RS indicator set, and is used for the QCL assumption indication under the spatial receiving parameter. Furthermore, if the CSI-RS is periodic or semi-persistent, and a measurement limitation window ID corresponding to the CSI-RS needs to be configured.

The DMRS port group in each PQI parameter set is associated with TRS resources, and is used for the QCL assumption indication under parameters such as Doppler shift, Doppler spread, average delay, and delay spread.

Finally, the base station indicates an activated PQI parameter set for data channel demodulation through the DCI signaling.

Configuring CSI-RS indicator elements and TRS information to the PQI parameter set is as shown in Table 2. Furthermore, if the CSI-RS is a periodic or semi-persistent reference signal, the measurement limitation window indicator needs to be provided with the CSI-RS indicator elements.

Figure 6:
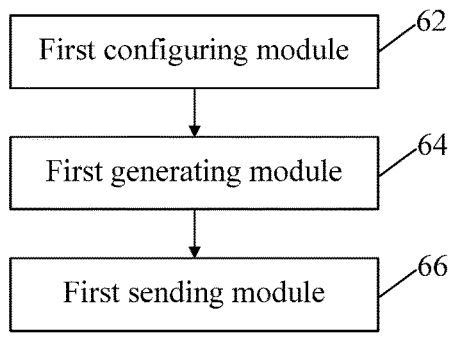
FIG. 6 is a block diagram of a reference signal configuring device according to an embodiment of the present disclosure.

FIG. 6, the device includes: a first configuring module 62, a first generating module 64, and a first sending module 66.

The first configuring module 62 is configured to set a first-type parameter set of a first-type reference signal indicator. The first-type parameter set includes N indicator elements, and N is an integer greater than or equal to 1.

The first generating module 64 is configured to generate first-type signaling according to the first-type parameter set, where the first-type signaling carries the first-type parameter set.

The first sending module 66, which is configured to send the first-type signaling to a second communication node.

In an embodiment, the first-type parameter set includes at least one of the following parameters: mapping information of a data channel resource element (RE), mapping information of a control channel RE, quasi co-location (QCL) information of a DeModulation reference signal (DMRS) port; QCL information of a DMRS port group; or setting information of a channel state information reference signal (CSI-RS).

In an embodiment, the first-type parameter set includes F first-type parameter subsets, each of which includes G indicator elements, where F and G are integers greater than or equal to 1.

TABLE 2

| PQI parameter | | QCL w.r.t, spatial RX parameter | TRS |
| --- | --- | --- | --- |
| $i^{th}$ parameter set | DM-RS port group i1 | CSI-RS indicator element i1 which comes from the configured reference signal indicator set (+ the measurement limitation window ID-i1 if the CSI-RS is the periodic or semi-persistent) | TRS indicator i1 |
| | DM-RS port group i2 | CSI-RS indicator element i2 which comes from the configured reference signal indicator set (+ the measurement limitation window ID-i2 if the CSI-RS is the periodic or semi-persistent) | TRS indicator i2 |

In summary, based on technical solutions provided by the embodiment of the present disclosure, an indicator indication information pool needed by the association (combination) of a reference signal and a prior reference signal, and the effective time and mapping method of the association (combination) are established. Further, a beam indication of DL and UL reference signals (group) is provided. In addition, a hierarchical reference signal indicator indication method is provided. In conjunction with activating a time frequency tracking signal and specifying a latency duration, the one-to-one mapping relationship between the reference signals and reference signals, the one-to-many mapping relationship between the reference signals and reference signals, the many-to-many mapping relationship between the reference signals and reference signals, as well as the channel characteristic assumption are achieved. This solution has no global beam number indication, and the beam indication can be implemented by flexibly expanding or modifying the reference signal indicator set.

Embodiment 2

According to another embodiment of the present disclosure, a reference signal configuring device is provided and applied to a first communication node. FIG. 6 is a block diagram of a reference signal configuring device according to an embodiment of the present disclosure. As shown in In an embodiment, a reference signal included in the first-type parameter subset is associated with one of the G indicator elements.

The association is that the reference signal comprised in the first-type parameter subset and a reference signal corresponding to the associated indicator element satisfy a channel characteristic assumption, where the channel characteristic assumption includes one of: a QCL assumption, a spatial QCL assumption, or satisfying a spatial receiving parameter requirement.

In an embodiment, the indicator element includes at least one of the following setting information: an indicator element number, a reference signal (RS) type indicator, a RS resource setting indicator, a RS resource set indicator, a RS resource indicator, a RS resource port indicator, a block indicator, a block burst indicator, a block burst set indicator, a measurement restriction window indicator, a time-domain window indicator, a reporting setting indicator, a beam group indicator, measurement restriction, setting restriction, or time-domain restriction.

In an embodiment, when sending the first-type signaling to the second communication node, a first-type reference signal is a set reference signal, a measured reference signal, or a reported reference signal.

In an embodiment, the first-type reference signal includes at least one of: an SS block, a CSI-RS, an SRS, a PRACH, a DMRS.

In an embodiment, the device further includes: an updating module, or a deleting module, or adding module.

The updating module is configured to update part of the indicator elements of the first-type parameter set, or update part of subsets of a first-type reference signal set.

The deleting module is configured to delete part of the indicator elements of the first-type parameter set, or delete part of subsets of the first-type reference signal set.

The adding module is configured to add an indicator element to the first-type parameter set.

In an embodiment, the device further includes: a second configuring module.

The second configuring module is configured to, when a configured indicator element number in the first-type parameter set is consistent with an indicator element number indicated by the signaling, update or configure, according to signaling indication, a content under the configured indicator element number to be a content carried by the signaling.

In an embodiment, a maximum number supporting the first-type reference signal indicator is greater than or equal to N.

In an embodiment, the device further includes: a second generating module and a second sending module.

The second generating module is configured to generate second-type signaling, where the second-type signaling is used for selecting, activating, or deactivating the indicator elements in the first-type parameter set or subsets of the first-type parameter set. K selected or activated indicator elements or K selected or activated subsets of the first-type parameter set constitute a second-type parameter set, where K is an integer greater than or equal to 1.

The second sending module is configured to send the second-type signaling to the second communication node.

In an embodiment, the device further includes: an adding or deleting module.

The adding or deleting module is configured to add an indicator element to the second-type parameter set; or delete an indicator element not belonging to the first-type parameter set from the second-type parameter set.

In an embodiment, the device further includes: a selection module.

The selection module is configured to select indicator elements from at least one of the second-type parameter set or the first-type parameter set to constitute a third-type parameter set. The third-type parameter set includes R third-type parameter subsets, and the third-type parameter subset includes hi indicator elements, where R and hi are integers greater than or equal to 1.

In an embodiment, the device further includes: a third generating module and a fourth sending module.

The third generating module is configured to generate third-type signaling. The third-type signaling is used for indicating that the indicator elements in the first-type parameter set, or the indicator elements in the second-type parameter set, or subsets of the third-type parameter set are mapped with and associated with second-type reference signals.

The fourth sending module is configured to send the third-type signaling to the second communication node.

In the embodiment, the second-type reference signal further includes one of: mapping information of a data channel resource element (RE), mapping information of a control channel RE, DMRS port information; DMRS port group information; or reference signal setting information of a channel state information reference signal (CSI-RS), or a physical downlink shared channel RE mapping and quasi-co-location indicator (PQI) information.

In an embodiment, the device further includes: a fourth generating module and a fifth sending module.

The fourth generating module is configured to generate fourth-type signaling, where the fourth-type signaling indicates that indicator elements in the second-type parameter set, or activated or selected first-type parameter subsets in the second-type parameter set, or the subsets of the first-type parameter set, or the indicator elements in the first-type parameter set are used for demodulation and/or beam indication of a control channel or data channel associated with the fourth-type signaling.

The fifth sending module is configured to send the fourth-type signaling to the second communication node.

In an embodiment, the second-type reference signals include U second-type reference signal subsets, where each of the U second-type reference signal subsets satisfies the channel characteristic assumption. The number of the indicator elements in the first-type parameter set, the number of the indicator elements in the second-type parameter set, or the number of the indicator elements in the third-type parameter subset is T, where U and T are integers greater than or equal to 1. The channel characteristic assumption includes one of: the QCL assumption, the spatial QCL assumption, or satisfying the spatial receiving parameter requirement.

In an embodiment, the second-type reference signal subset or second-type reference signal element can only be mapped with one indicator element.

In an embodiment, the mapping rule includes at least one of the following rules.

A mapping relationship is specified, where the mapping relationship is configured by the first communication node or from a predefined mapping relationship set.

It is specified that, according to a low-to-high sequence number order or a high-to-low sequence number order, the U second-type reference signal subsets are sequentially mapped with T indicator elements or subsets with a step V.

According to a predefined mapping pattern, the U second-type reference signal subsets are sequentially mapped with the T indicator elements or subsets.

V is 1, or is an positive number greater than 1 or less than 1. When an accumulated step is not an integer, V is rounded to an integer.

In an embodiment, V=T/U or V is specified by the first communication node.

In an embodiment, the second-type reference signal includes at least one of: a UL DMRS, a DL DMRS, a CSI-RS, an SRS, or a TRS.

In an embodiment, the second-type reference signals, and reference signals corresponding to the indicator elements in the first-type parameter set, the indicator elements in the second-type parameter set, or subsets of the third-type parameter set satisfy the channel characteristic assumption, where the channel characteristic assumption includes one of: the QCL assumption, the spatial QCL assumption, or satisfying the spatial receiving parameter requirement.

In an embodiment, it takes Y time units or X time windows from the transmission of the signaling of the second-type parameter set to the time when the signaling comes into effect, or it takes Y time units or X time windows from the transmission of the signaling of the third-type parameter set to the time when the signaling comes into effect, where the time units are OFDM symbols, slots or subframes.

In an embodiment, the device further includes: a third sending module.

The third sending module is configured to, after activating or selecting the indicator elements in the first-type parameter set or adding an indicator element to the second-type parameter set, send third-type reference signal satisfying the channel characteristic assumption with the elements, where the channel characteristic assumption includes one of: a QCL assumption, a spatial QCL assumption, or satisfying a spatial receiving parameter requirement.

In an embodiment, the third sending module is configured to send the third-type reference signal, when the indicator elements in the first-type parameter set are activated or selected or the indicator elements are added to the second-type parameter set, after X time units or X time units after an acknowledgement replied by the second communication node, or send the third-type reference signal on a period or semi-persistent sending window, where X is an integer greater than or equal to 0, and the time units are OFDM symbols, slots or subframes.

In an embodiment, the third-type reference signal further includes one of: the CSI-RS, a CSI-RS used for time frequency tracking, or the TRS.

Correspondingly, the embodiment of the present disclosure further provides a reference signal configuring device applied to a second communication node. The device includes: a first reception module, which is configured to receive first-type signaling sent by a first communication node; and a processing module, which is configured to determine a configured first-type parameter set of a first-type reference signal indicator according to the first-type signaling, where the first-type parameter set comprises N indicator elements, and N is an integer greater than or equal to 1.

In an embodiment, the device may further include: a second reception module, which is configured to receive second-type signaling sent by the first communication node. The processing module is configured to select, activate, or deactivate the indicator elements in the first-type parameter set or subsets of the first-type parameter set according to the second-type signaling. K selected or activated indicator elements or K selected or activated subsets of the first-type parameter set constitute a second-type parameter set, K is an integer greater than or equal to 1.

In an embodiment, the device further includes: a third reception module, which is configured to receive third-type signaling sent by the first communication node. The processing module is configured to determine, according to the third-type signaling, that the indicator elements in the first-type parameter set or the indicator elements in the second-type parameter set, or subsets of the third-type parameter set are mapped with and associate with second-type reference signals.

In an embodiment, the device further includes: a fourth reception module, which is configured to receive fourth-type signaling sent by the first communication node. The processing module is configured to determine, according to the fourth-type signaling, that the indicator elements in the second-type parameter set, or activated or selected first-type parameter subsets in the second-type parameter set, or the subsets of the first-type parameter set, or the indicator elements in the first-type parameter set are used for demodulation and/or beam indication of a control channel or data channel associated with the fourth-type signaling.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

An embodiment of the present disclosure further provides a storage medium. The storage medium includes stored programs. When executed, the programs execute any of above-mentioned methods of the first communication node or the second communication node.

Optionally, in the embodiment, the storage medium may be configured to store program codes for performing steps described below.

In step S11, a first-type parameter set of a first-type reference signal indicator is configured, where the first-type parameter set includes N indicator elements, and N is an integer greater than or equal to 1.

In step S12, first-type signaling is generated according to the first-type parameter set, where the first-type signaling carries the first-type parameter set.

In step S13, the first-type signaling is sent to a second communication node.

Optionally, in this embodiment, the storage medium may be configured to store program codes for performing steps described below.

In step S31, first-type signaling sent by a first communication node is received.

In step S32, a configured first-type parameter set of a first-type reference signal indicator is determined according to the first-type signaling, where the first-type parameter set includes N indicator elements, and N is an integer greater than or equal to 1.

Optionally, in the embodiment, the storage medium described above may include, but is not limited to, a USB flash disk, a read-only memory (ROM), a random access memory (RAM), a mobile hard disk, a magnetic disk, an optical disk or various other media capable of storing program codes.

Embodiment 4

The embodiment of the present disclosure further provides a processor. The processor is configured to execute programs. When executed, the programs perform the steps in any method described above.

Optionally, in the embodiment, the programs described above are used for performing the steps described below.

In step S21, a first-type parameter set of a first-type reference signal indicator is set, where the first-type parameter set includes N indicator elements, and N is an integer greater than or equal to 1.

In step S22, first-type signaling is generated according to the first-type parameter set, where the first-type signaling carries the first-type parameter set.

In step S23, the first-type signaling is sent to a second communication node.

Optionally, in this embodiment, the programs described above are used for performing the steps described below.

In step S41, first-type signaling sent by a first communication node is received.

In step S42, a configured first-type parameter set of a first-type reference signal indicator is determined according to the first-type signaling, where the first-type parameter set includes N indicator elements, and N is an integer greater than or equal to 1.

Optionally, for specific examples in the embodiment, reference may be made to the examples described in the above-mentioned embodiments and optional embodiments, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of two computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or two modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like within the principle of the present disclosure shall fall within the scope of the present disclosure.

What is claimed is:

1. A method for wireless communication, comprising:
receiving, by a user equipment, a Radio Resource Control (RRC) signaling message from a base station, the RRC signaling message including a set of configurations, each configuration indicating a quasi co-location (QCL) assumption between a reference signal and a demodulation reference signal (DMRS) port of a Physical Downlink Shared Channel (PDSCH), wherein the set comprises M configurations, M being an integer greater than 1;
receiving, by the user equipment, a Medium Access Control (MAC) control element (CE) signaling message from the base station activating one or more configurations of the set of configurations, wherein the MAC CE signaling message enables signaling of two configurations using a same identifier;
assuming, by the user equipment based on the one or more configurations, that the QCL assumption between the DMRS port and a resource in a resource set for the reference signal has QCL parameters of Doppler shift, Doppler spread, average delay, and delay spread; and
receiving, by the user equipment, a Downlink Control Information (DCI) signaling message from the base station specifying the identifier corresponding to the two configurations.

2. The method of claim 1, wherein each of the set of configurations comprises N indicator elements, N being an integer greater than or equal to 1, and wherein each indicator element comprises a reference signal resource indicator.

3. The method of claim 1, wherein the reference signal comprises a channel state information reference signal (CSI-RS).

4. The method of claim 1, further comprising:
assuming, by the user equipment in response to the reference signal being periodic, that the QCL assumption between the DMRS port and the resource in the resource set for the reference signal has a spatial receiving parameter.

5. The method of claim 1, wherein the activated one or more configurations are applied by the user equipment at Y slots after the MAC CE signaling message is transmitted, Y being a positive integer.

6. A method for wireless communication, comprising:
transmitting, by a base station, a Radio Resource Control (RRC) signaling message to a user equipment, the RRC signaling message including a set of configurations, each configuration indicating a quasi co-location (QCL) assumption between a reference signal and a demodulation reference signal (DMRS) port of a Physical Downlink Shared Channel (PDSCH), wherein the set comprises M configurations, M being an integer greater than 1;
transmitting, by the base station, a Medium Access Control (MAC) control element (CE) signaling message to the user equipment activating one or more configurations of the set of configurations, wherein the QCL assumption between the DMRS port and a resource in a resource set for the reference signal is assumed to have QCL parameters of Doppler shift, Doppler spread, average delay, and delay spread, wherein the MAC CE signaling message enables signaling of two configurations using a same identifier; and
transmitting, by the base station, a Downlink Control Information (DCI) signaling message to the user equipment specifying the identifier corresponding to the two configurations.

7. The method of claim 6, wherein each of the set of configurations comprises N indicator elements, N being an integer greater than or equal to 1, and wherein each indicator element comprises a reference signal resource indicator.

8. The method of claim 6, wherein the reference signal comprises a channel state information reference signal (CSI-RS).

9. The method of claim 6, wherein the QCL assumption between the DMRS port and the resource in the resource set for the reference signal is assumed by the user equipment to have a spatial receiving parameter in response to the reference signal being periodic.

10. The method of claim 6, wherein the activated one or more configurations are applied by the user equipment at Y slots after the MAC CE signaling message is transmitted, Y being a positive integer.

11. A device for wireless communications, comprising a processor that is configured:
receive a Radio Resource Control (RRC) signaling message from a base station, the RRC signaling message including a set of configurations, each configuration indicating a quasi co-location (QCL) assumption between a reference signal and a demodulation reference signal (DMRS) port of a Physical Downlink Shared Channel (PDSCH), wherein the set comprises M configurations, M being an integer greater than 1;
receive a Medium Access Control (MAC) control element (CE) signaling message from the base station activating one or more configurations of the set of configurations, wherein the MAC CE signaling message enables signaling of two configurations using a same identifier;
assume, based on the one or more configurations, that the QCL assumption between the DMRS port and a resource in a resource set for the reference signal has QCL parameters of Doppler shift, Doppler spread, average delay, and delay spread; and
receive a Downlink Control Information (DCI) signaling message from the base station specifying the identifier corresponding to the two configurations.

12. The device of claim 11, wherein each of the set of configurations comprises N indicator elements, N being an integer greater than or equal to 1, and wherein each indicator element comprises a reference signal resource indicator.

13. The device of claim 11, wherein the reference signal comprises a channel state information reference signal (CSI-RS).

14. The device of claim 11, wherein the processor is configured to assume, in response to the reference signal being periodic, that the QCL assumption between the DMRS port and the resource in the resource set for the reference signal has a spatial receiving parameter.

15. The device of claim 11, wherein the activated one or more configurations are applied by the device at Y slots after the MAC CE signaling message is transmitted, Y being a positive integer.

16. A device for wireless communication, comprising a processor that is configured to:
 transmit a Radio Resource Control (RRC) signaling message to a user equipment, the RRC signaling message including a set of configurations, each configuration indicating a quasi co-location (QCL) assumption between a reference signal and a demodulation reference signal (DMRS) port of a Physical Downlink Shared Channel (PDSCH), wherein the set comprises M configurations, M being an integer greater than 1;
 transmit a Medium Access Control (MAC) control element (CE) signaling message to the user equipment activating one or more configurations of the set of configurations, wherein the QCL assumption between the DMRS port and a resource in a resource set for the reference signal is assumed to have QCL parameters of Doppler shift, Doppler spread, average delay, and delay spread, wherein the MAC CE signaling message enables signaling of two configurations using a same identifier; and
 transmit a Downlink Control Information (DCI) signaling message to the user equipment specifying the identifier corresponding to the two configurations.

17. The device of claim 16, wherein each of the set of configurations comprises N indicator elements, N being an integer greater than or equal to 1, and wherein each indicator element comprises a reference signal resource indicator.

18. The device of claim 16, wherein the reference signal comprises a channel state information reference signal (CSI-RS).

19. The device of claim 16, wherein the QCL assumption between the DMRS port and the resource in the resource set for the reference signal is assumed by the user equipment to have a spatial receiving parameter in response to the reference signal being periodic.

20. The device of claim 16, wherein the activated one or more configurations are applied by the user equipment at Y slots after the MAC CE signaling message is transmitted, Y being a positive integer.

* * * * *